April 8, 1952     F. H. LAWRENZ     2,592,438
TROT LINE SNELL FASTENER AND HOOK SHIELD
Filed June 6, 1949
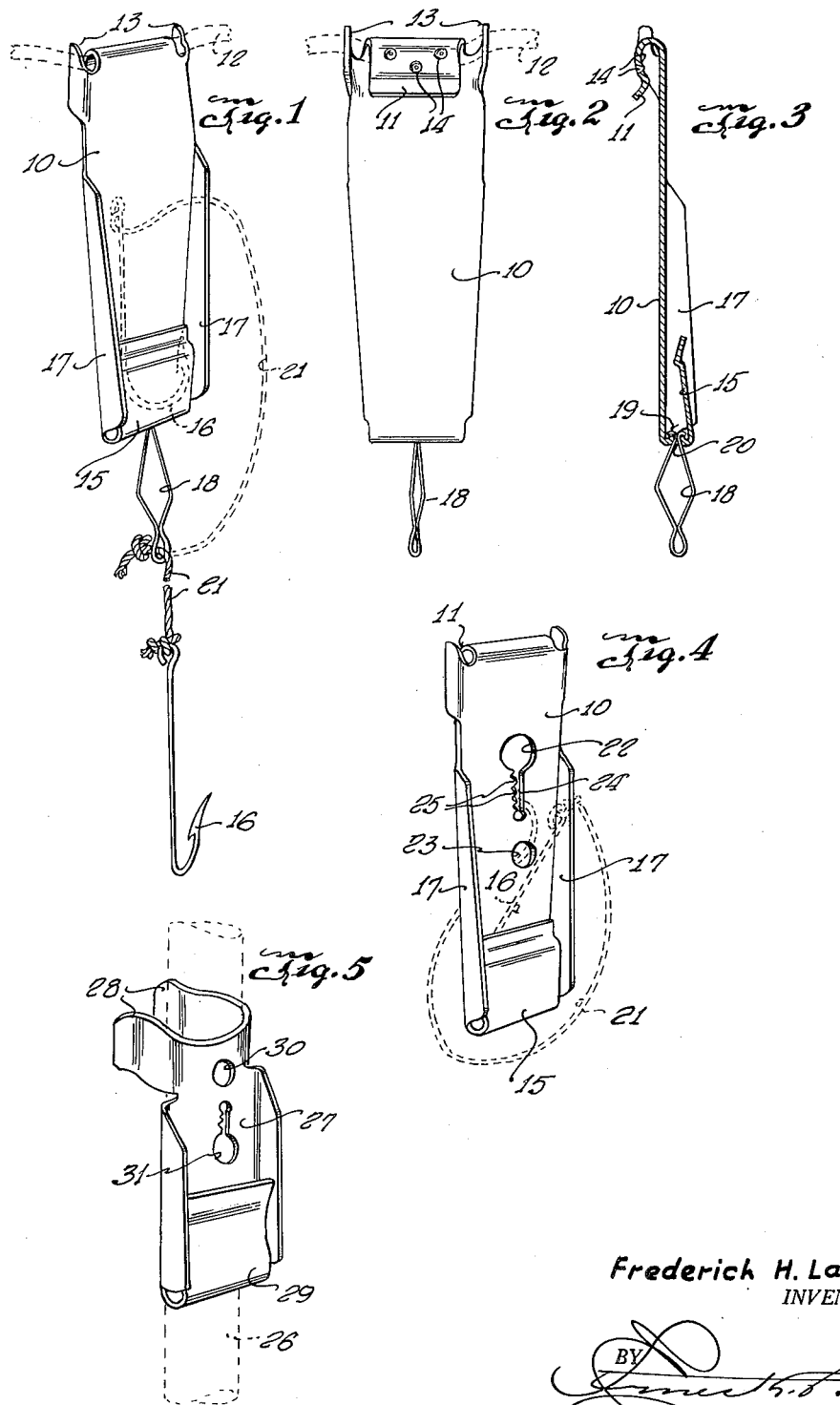
Frederick H. Lawrenz
INVENTOR.
ATTORNEY Patented Apr. 8, 1952

2,592,438

UNITED STATES PATENT OFFICE 2,592,438

TROTLINE SNELL FASTENER AND HOOK SHIELD

Frederich H. Lawrenz, Dallas, Tex.

Application June 6, 1949, Serial No. 97,495

4 Claims. (Cl. 43—44.85)

This invention relates to fishing equipment and it has particular reference to improvements in snells or staging for trot lines.

The principal object of the invention is to provide a device which is at once a snell suspension or clamp and a fish hook guard. The device is formed of a single piece of material to define at one end a clamp adapted to engage a trot line with such gripping action as to preclude slippage of the device on the line and, supplementing the holding action of the clamp is a pair of opposing ears which are effective to impose a kink in the trot line to further prevent sliding displacement of the device, yet will not prevent ready removal of the latter from the line when it is properly manipulated.

Another object of the invention is to provide a snell fastener as set forth, whose construction includes a clip formed on the end thereof opposite the line clamp and which is designed to receive the hook on the snell when not in use. This feature of the invention is calculated to minimize the painstaking effort usually expended in disentangling the snells and hooks preparatory to setting a trot line as well as dismantling or reeling in such a line. Moreover, much of the hazard presented by the unprotected hooks is obviated. An added object is to provide flanges on the device on opposite sides of the hook clip as a protection for the hands in removing a hook from the clip.

Still another object of the invention is to provide a swivel connection for the snell or staging, which is removably retained in an aperture in the bottom of the hook clip and which prevents entanglement of the snell by the tugging of a fish caught on the hook.

Other objects will become manifest as the description proceeds, taken in connection with the accompanying drawing, wherein:

Figure 1 is a perspective view of a snell fastener and hook guard constructed according to the invention.

Figure 2 is a rear elevational view.

Figure 3 is a view in longitudinal section.

Figure 4 is a front perspective view of a slightly modified form of the invention, and Figure 5 is a front perspective view of yet another modification, showing the adaptation of the invention to a fishing rod or pole.

Continuing with a more detailed description of the invention, reference numeral 10 denotes a plate constituting the body of the combined snell fastener and hook guard whose upper end is rolled back onto the body to form a clamp 11 which is adapted to snugly engage over a trot line 12. Formed on the body on each side of the clamp 11 is an ear 13. These opposed ears impose a slight upward thrust on the line 12 where it emerges from the clamp and thus are effective to hold the device against longitudinal slippage on the line. Supplementing the holding action of the clamp and ears is a series of dimples or inthrust apertures 14 made in the clamp to press inwardly on the line 12.

The lower end of the body 10 is rolled to lie against the body, with its extremity turned outwardly therefrom and thus form a clip 15 into which may be thrust a hook 16, as suggested in dotted lines in Figures 1 and 4. The hook is placed in the guard defined by the clip when not in use.

Formed on each side of the body 10 is a flange 17, originating above the midsection of the body and terminating at the end on which is formed the hook guard 15. These flanges define a channel which provides a protection for the fingers as the hook is withdrawn from the guard and further afford a purchase in holding the device, in applying it to a line, extracting or replacing the hook or in baiting hooks on the stages of the line.

The preferred form of the invention such as shown in Figures 1 to 3, provides a swivel 18 in the form of steel wire, bent in the shape substantially as shown. The ends of the swivel are curved in opposite directions as at 19 (Fig. 3) to engage over a small, inwardly directed flange formed by punching a hole 20 into the bottom of the clip 15. The swivel is inserted by pressing the legs of the swivel towards each other to bring the hooked ends thereof into the same plane in which they are easily inserted into the hole 20, after which the hooks expand and engage over the flange of the hole, making it impossible that that they become accidentally disengaged from the hole. The snell 21, to which is attached the hook 16 is connected in a suitable manner to the swivel 18.

In Figure 4, the only difference in construction of the device therein shown over that described is the substitution of a pair of longitudinally aligned apertures 22 and 23 for the swivel for attaching the snell 21 to the body 10. The aperture 22 has a communicating slot 24, extending towards the aperture 23 and which becomes increasingly narrower at its lower end. One side of the slot has therein a series of serrations 25, the purpose of which will become apparent presently.

To apply the snell 21, a knot is made in the end thereof opposite the hook 16 and which knot is inserted through the aperture 23 from the opposite side as viewed in Figure 4 or the rear face of the device. The knotted end of the snell is then inserted through the upper aperture 22, whereupon the snell is pulled downwardly so that its upper end will be drawn into the slot 24. The knot prevents the snell from being pulled from the slot and upward displacement is prevented by the serrations 25. Tapering of the slot is for the purpose of accommodating the same to staging of different diameters.

As in the preceding instance, the hooks, when not in use, are slipped into the socket or clip 15 of the devices where their barbs are shielded and cannot snag the hands or become caught in the clothing.

Figure 5 reveals substantially the same principle as that disclosed in the preceding figures but the device therein shown is adapted to hold a hook and line on a fishing pole 26. The device consists of the body 27, on one end of which is formed a clamp consisting of curved arms 28 which are designed to embrace and grip the pole 26 and thus hold the device thereon.

On the opposite end of the body 27 is formed a clip 29 in which is inserted a fishing hook as a guard therefor when not in use. Holes 30 and 31 are adapted to hold the end of the fishing line, not shown, the same being knotted at one end to be slipped through the hole 30 and engaged by the serrations in a slot 32 communicating with the hole 31, in the manner described for the showing in Figure 4.

Manifestly, the construction as shown and described is capable of some modification and such modification as may be construed to fall within the scope and meaning of the appended claims is also considered to be within the spirit and intent of the invention.

What is claimed is:

1. As a new article of manufacture, a combined fastener and hook guard for trot lines comprising a substantially flat body portion having end portions reduced in width and turned back upon said body portion to define at its upper end a trot line clamp and at its lower end a clip, a right angular flange formed on each side edge of said body to overlie the open sides of said clip to thereby define a receptacle substantially closed except at the top thereof, swivel means releasably attached to said clip, and a fish hook attached to said swivel means by a flexible leader, said leader permitting the bight end of said hook to be aligned with said clip and inserted in said receptacle.

2. As a new article of manufacture, a combined snell fastener and fish hook guard for a trot line comprising a tapered body, a clamp formed on one end of said body adapted to engage said trot line, ears formed on said body on each side of said clamp and engageable with said trot line to preclude slippage of said clamp with respect to said trot line, a fish hook receiving clip formed on the opposite end of said body, a right angular flange on each side of said body flanking said clip and providing a guide channel for a fish hook during its movement into and out of said clip, a fish hook and a snell attached thereto, and means on said body for detachably connecting the end of said snell opposite the hook carried thereby said snell permitting the bight end of said fish hook to be inserted in said clip.

3. A combined snell fastener and hook guard for a trot line comprising a plate having its ends turned back upon itself to define at its upper end a trot line engaging clamp and at its lower end a fish hook receiving clip, a flange turned on each side of said plate adapted to substantially close the open sides of said clip to define a receptacle and extending upwardly above the clip to provide a protective guide for a fish hook as the latter is moved into and out of said receptacle, a fish hook and a snell, and means for suspending said snell from the lower end of said plate said snell permitting the bight end of said fish hook to be inserted in said receptacle.

4. A combined snell fastener and hook guard for a trot line comprising a plate having a trot line engaging clamp formed on the upper end thereof, ears on opposite sides of said clamp adapted to engage said trot line to prohibit accidental displacement of said trot line from said clamp, a right angular flange formed on each side edge of said plate, said plate having a lower end equal in width to that of the space between said flanges and turned upwardly to occupy part of the length of said space and to define a hook receptacle closed at its bottom and partially closed at its sides and adapted to be outwardly sprung at its upper end to admit a fish hook, a fish hook and a snell attached thereto and means for attaching said snell to the lower end of said receptacle said snell permitting the bight end of said fish hook to be inserted in said receptacle.

FREDERICH H. LAWRENZ.

REFERENCES CITED

The following references are of record in the file of this patent:

UNITED STATES PATENTS

| Number | Name | Date |
| --- | --- | --- |
| 881,757 | Winsor | Mar. 10, 1908 |
| 1,189,199 | Hackmann | June 27, 1916 |
| 1,232,545 | Hilsz | July 10, 1917 |
| 1,370,452 | Kane | Mar. 1, 1921 |
| 2,366,816 | Stapleton | Jan. 9, 1945 |
| 2,466,939 | Fowler | Apr. 12, 1949 |